(12) United States Patent
Jan

(10) Patent No.: US 10,365,638 B2
(45) Date of Patent: Jul. 30, 2019

(54) SCHEDULING PROCESS FOR AUTOMATED MATTRESS MANUFACTURING

(71) Applicant: DREAMWELL, LTD., Las Vegas, NV (US)

(72) Inventor: Francis G. Jan, Atlanta, GA (US)

(73) Assignee: DREAMWELL, LTD., Las Vegas, NV (US)

( * ) Notice: Subject to any disclaimer, the term of this patent is extended or adjusted under 35 U.S.C. 154(b) by 283 days.

(21) Appl. No.: 15/003,948

(22) Filed: Jan. 22, 2016

(65) Prior Publication Data

US 2016/0216707 A1 Jul. 28, 2016

Related U.S. Application Data

(60) Provisional application No. 62/106,951, filed on Jan. 23, 2015.

(51) Int. Cl.
*G05B 19/418* (2006.01)
*G06Q 10/06* (2012.01)

(52) U.S. Cl.
CPC ....... *G05B 19/41865* (2013.01); *G06Q 10/06* (2013.01); *G05B 2219/32062* (2013.01); *Y02P 80/30* (2015.11); *Y02P 90/20* (2015.11)

(58) Field of Classification Search
CPC .... G05B 19/41865; G05B 2219/32062; G06G 10/06; Y02P 90/20
(Continued)

(56) References Cited

U.S. PATENT DOCUMENTS 685,160 A 10/1901 Marshall
1,706,267 A 3/1929 Van De Mark et al.
(Continued)

FOREIGN PATENT DOCUMENTS

CH 683840 A5 5/1994
CN 102281798 A 12/2011
(Continued)

OTHER PUBLICATIONS

Notification of Transmittal of the International Search Report and the Written Opinion of the International Searching Authority, or the Declaration, issued in International Application No. PCT/US2016/014480, dated Jun. 21, 2016; 5 pages.
(Continued)

*Primary Examiner* — Long K Tran
(74) *Attorney, Agent, or Firm* — Cantor Colburn LLP

(57) ABSTRACT

Disclosed herein methods for scheduling the automated manufacturing of mattresses. Aspects include receiving a plurality of customer orders for mattresses, wherein each of the plurality of customer orders includes a due date and organizing the plurality of customer orders into production batches based on the due dates. Aspects also include analyzing a first production batch of the daily production schedule and responsively creating an optimized hour production batch and based on a determination that the optimized first production batch exceeds a performance threshold 1, dispatching the first hourly production batch to an automated manufacturing system for production. Based on a determination that the optimized first hour production batch does not exceed the performance threshold, aspects further include analyzing a second production batch and modifying the optimized first production batch and the second production batch to create an optimized second production batch.

10 Claims, 4 Drawing Sheets

(58) Field of Classification Search
USPC .................................................. 700/100
See application file for complete search history.

(56) References Cited

U.S. PATENT DOCUMENTS

| | | | |
|---|---|---|---|
| 1,733,660 A | 10/1929 | Gail | |
| 2,604,210 A | 7/1952 | Boone | |
| 3,180,293 A | 4/1965 | Cash | |
| 3,279,631 A | 10/1966 | McCartney | |
| 3,689,106 A | 9/1972 | Young | |
| 3,720,329 A | 3/1973 | Gamble | |
| 3,885,691 A | 5/1975 | Knapp | |
| 3,934,740 A | 1/1976 | Rumell | |
| 4,000,870 A | 1/1977 | Davies | |
| 4,020,959 A | 5/1977 | Livesay | |
| 4,049,286 A | 9/1977 | Francis, Jr. | |
| 4,074,505 A | 2/1978 | Keren et al. | |
| 4,234,983 A | 11/1980 | Stumpf | |
| 4,234,984 A | 11/1980 | Stumpf | |
| 4,274,168 A | 6/1981 | Depowski | |
| 4,355,940 A | 10/1982 | Derickson | |
| 4,439,977 A | 4/1984 | Stumpf | |
| 4,451,946 A | 6/1984 | Stumpf | |
| 4,459,663 A * | 7/1984 | Dye ....................... | G06Q 10/06 700/100 |
| 4,523,344 A | 6/1985 | Stumpf | |
| 4,541,768 A | 9/1985 | Walker et al. | |
| 4,565,046 A | 1/1986 | Stumpf | |
| 4,578,834 A | 4/1986 | Stumpf | |
| 4,724,590 A | 2/1988 | Langas et al. | |
| 4,787,808 A | 11/1988 | Shimoji et al. | |
| 4,806,061 A | 2/1989 | Fenton | |
| 4,815,182 A | 3/1989 | Langas et al. | |
| 4,832,185 A | 5/1989 | Huber | |
| 4,839,933 A | 6/1989 | Plewright et al. | |
| D303,030 S | 8/1989 | Goldston | |
| 4,873,732 A | 10/1989 | Perez | |
| 4,995,162 A | 2/1991 | Betere Cabeza | |
| 5,161,844 A | 11/1992 | Zimmer et al. | |
| 5,326,212 A | 7/1994 | Roberts | |
| 5,478,190 A | 12/1995 | Helton | |
| 5,495,809 A | 3/1996 | Carbo | |
| 5,613,287 A | 3/1997 | St. Clair | |
| 5,621,935 A | 4/1997 | St. Clair | |
| 5,704,624 A | 1/1998 | Davis | |
| 5,746,877 A | 5/1998 | Notheis et al. | |
| 5,756,022 A | 5/1998 | Siegel et al. | |
| 5,934,041 A | 8/1999 | Rudolf et al. | |
| 6,079,941 A | 6/2000 | Lee | |
| 6,101,697 A | 8/2000 | Stumpf et al. | |
| 6,178,723 B1 | 1/2001 | Mossbeck | |
| 6,260,331 B1 | 7/2001 | Stumpf | |
| 6,273,257 B1 | 8/2001 | Mossbeck | |
| 6,386,560 B2 | 5/2002 | Calendar | |
| 6,817,578 B1 | 11/2004 | Garcia et al. | |
| 6,860,493 B2 | 3/2005 | Orozco | |
| 7,007,790 B2 | 3/2006 | Brannon | |
| 7,383,676 B1 | 6/2008 | Schmidt et al. | |
| 7,465,143 B1 | 12/2008 | Adams | |
| 7,731,206 B2 | 6/2010 | Borrmann | |
| 7,731,207 B2 | 6/2010 | Santos Gómez | |
| 8,042,829 B2 | 10/2011 | Hailston et al. | |
| 8,104,807 B2 | 1/2012 | Maffeis | |
| 8,596,611 B1 | 12/2013 | Fountain | |
| 8,851,488 B2 | 10/2014 | Carruyo | |
| 8,979,099 B1 | 3/2015 | Ellis | |
| 9,192,266 B2 | 11/2015 | Starr et al. | |
| D744,713 S | 12/2015 | Della Polla | |
| 9,216,752 B1 | 12/2015 | Carruyo | |
| 2003/0149608 A1 * | 8/2003 | Kall ....................... | G06Q 10/06 705/7.27 |
| 2003/0209827 A1 | 11/2003 | Levera et al. | |
| 2004/0061267 A1 | 4/2004 | Brown | |
| 2004/0224086 A1 | 11/2004 | Wright | |
| 2004/0227086 A1 | 11/2004 | Haug et al. | |
| 2004/0254825 A1 * | 12/2004 | Hsu ....................... | G06Q 10/06 705/7.24 |
| 2004/0261186 A1 | 12/2004 | Gladney | |
| 2005/0161363 A1 | 7/2005 | Kowalski et al. | |
| 2005/0256776 A1 * | 11/2005 | Bayoumi ............ | G06Q 10/087 705/26.1 |
| 2005/0257883 A1 | 11/2005 | Anagnostopoulos | |
| 2007/0214625 A1 | 9/2007 | Brown et al. | |
| 2008/0012260 A1 | 1/2008 | Ouyang et al. | |
| 2008/0149030 A1 | 6/2008 | Klein | |
| 2010/0071136 A1 | 3/2010 | Weber | |
| 2010/0072676 A1 | 3/2010 | Gladney et al. | |
| 2010/0281666 A1 | 11/2010 | Tseng | |
| 2011/0253770 A1 | 10/2011 | Resta et al. | |
| 2011/0282476 A1 * | 11/2011 | Hegemier ............ | G06Q 10/087 700/100 |
| 2012/0091688 A1 | 4/2012 | Fink | |
| 2015/0183567 A1 | 7/2015 | Tevault et al. | |
| 2015/0203221 A1 | 7/2015 | Van De Dey et al. | |

FOREIGN PATENT DOCUMENTS

| | | |
|---|---|---|
| DE | 2856600 A1 | 7/1980 |
| DE | 3540233 A1 | 11/1985 |
| DE | 4307142 C1 | 5/1994 |
| DE | 202012100849 U1 | 5/2012 |
| DE | 102011083451 A1 | 3/2013 |
| EP | 2316783 A1 | 10/2009 |
| EP | 2147775 A2 | 1/2010 |
| JP | S59162056 U | 10/1984 |
| JP | 2005333827 A | 12/2008 |
| WO | 1996027553 A1 | 12/1996 |
| WO | 2005065493 A1 | 7/2005 |
| WO | 2009103173 A1 | 8/2009 |
| WO | 2013041894 A1 | 3/2013 |
| WO | 2016118831 A1 | 7/2016 |

OTHER PUBLICATIONS

Written Opinion of the International Searching Authority, issued in International Application No. PCT/US2016/014480, dated Jun. 21, 2016; 6 pages.
Goldman R.P., et al: "A Constraint-Based Scheduler for Batch Manufacturing," IEEE Expert, IEEE Service Center, New York, NY, US. vol. 12, No. 1: Jan. 1, 1997, pp. 49-56, XP000689724.
Notification of Transmittal of the International Search Report and the Written Opinion of the International Searching Authority, or the Declaration, issued in International Application No. PCT/US2016/014473, dated Apr. 4, 2016; 5 pages.
Notification of Transmittal of the International Search Report and the Written Opinion of the International Searching Authority, or the Declaration, issued in International Application No. PCT/US2016/014474, dated Apr. 19, 2016; 6 pages.
Notification of Transmittal of the International Search Report and the Written Opinion of the International Searching Authority, or the Declaration, issued in International Application No. PCT/US2016/014476, dated Apr. 4, 2016; 10 pages.
Notification of Transmittal of the International Search Report and the Written Opinion of the International Searching Authority, or the Declaration, issued in International Application No. PCT/US2016/014482, dated Apr. 20, 2016; 6 pages.
Notification of Transmittal of the International Search Report and the Written Opinion of the International Searching Authority, or the Declaration, issued in International Application No. PCT/US2016/014525, dated Apr. 8, 2016; 11 pages.
Notification of Transmittal of the International Search Report and the Written Opinion of the International Searching Authority, or the Declaration, issued in International Application No. PCT/US2016/014576, dated Apr. 25, 2016; 4 pages.
Written Opinion of the International Searching Authority, issued in International Application No. PCT/US2016/014473, dated Apr. 4, 2016; 6 pages.
Written Opinion of the International Searching Authority, issued in International Application No. PCT/US2016/014474, dated Apr. 19, 2016; 6 pages.

(56) References Cited

OTHER PUBLICATIONS

Written Opinion of the International Searching Authority, issued in International Application No. PCT/US2016/014476, dated Apr. 4, 2016; 10 pages.
Written Opinion of the International Searching Authority, issued in International Application No. PCT/US2016/014482, dated Apr. 20, 2016; 6 pages.
Written Opinion of the International Searching Authority, issued in International Application No. PCT/US2016/014576, dated Apr. 25, 2016; 6 pages.
Elektroteks, Automatic Mattress Production Line, Jan. 9, 2013, Vimeo Video, https://vimeo.com/57094698 (Year: 2013).
Notification Concerning Transmittal of International Preliminary Report on Patentability (Chapter I of the Patent Cooperation treaty), issued in International Application No. PCT/US2016/014473, dated Aug. 3, 2017; 8 pages.
Notification Concerning Transmittal of International Preliminary Report on Patentability (Chapter I of the Patent Cooperation treaty), issued in International Application No. PCT/US2016/014474, dated Aug. 3, 2017; 8 pages.
Notification Concerning Transmittal of International Preliminary Report on Patentability (Chapter I of the Patent Cooperation treaty), issued in International Application No. PCT/US2016/014476, dated Aug. 3, 2017; 7 pages.
Notification Concerning Transmittal of International Preliminary Report on Patentability (Chapter I of the Patent Cooperation treaty), issued in International Application No. PCT/US2016/014480, dated Jul. 25, 2017; 8 pages.
Notification Concerning Transmittal of International Preliminary Report on Patentability (Chapter I of the Patent Cooperation treaty), issued in International Application No. PCT/US2016/014482, dated Aug. 3, 2017; 8 pages.
Notification Concerning Transmittal of International Preliminary Report on Patentability (Chapter I of the Patent Cooperation treaty), issued in International Application No. PCT/US2016/014525, dated Aug. 3, 2017; 9 pages.
Notification Concerning Transmittal of International Preliminary Report on Patentability (Chapter I of the Patent Cooperation treaty), issued in International Application No. PCT/US2016/014576, dated Aug. 3, 2017; 7 pages.
Translation of CH 683840 A5, Antonio Betere Cabeza, published May 31, 1994.
Translation of DE 3540233 A1, Josef Rosier, published May 14, 1985.

* cited by examiner

SCHEDULING PROCESS FOR AUTOMATED MATTRESS MANUFACTURING

CROSS-REFERENCE TO RELATED APPLICATIONS

This application is a NON-PROVISIONAL of and claims the benefit of U.S. Application No. 62/106,951, filed Jan. 23, 2015, which is incorporated herein by reference in its entirety.

BACKGROUND

The present disclosure generally relates to automated mattress manufacturing, and more particularly, to a scheduling process for automated mattress manufacturing.

In general, mattress manufacturing is complicated due to the wide variety of materials and configurations thereof that can be used to each of several components of a mattress. For example, mattress may include an innercore that has pocketed coils and/or one or more types of foam material. The material, size, shape, and density of the coils of the innercore can vary within a single mattress as well as across various mattress types. In addition, mattresses include a topper layer which can include multiple layers of foam material, with the types and arrangement of the various layers varying widely. Furthermore, mattress includes a quilted topper that can include multiple layers textiles and foam material, with the types and arrangement of the various layers varying widely. As a result of the large number of available mattress configurations, mattresses are traditionally made on an on-demand basis, i.e., a mattress is not manufactured until it has been ordered by a customer.

Traditional processes for manufacturing the mattress include numerous steps that each requires a significant amount of manual labor typically organized in batch production. Recently, automated manufacturing processes have been developed which drastically reduces the amount of manual labor required in each of the steps of the mattress manufacturing process. As a result, the speed at which each of the manufacturing steps can be performed has been reduced. The automated manufacturing processes include the use of a variety of specialty machines that have each been developed to perform one of the numerous manufacturing steps. Each of the numerous steps varies in complexity and requires a different amount of time to perform. Due to the large number of possible mattress configurations, one or more of the automated manufacturing steps must modified, or changed over, to switch from producing one mattress configuration to another.

Accordingly, what is needed is a method of scheduling the automated manufacturing mattresses with varying configurations to maximize throughput and to reduce down time and material waste.

BRIEF SUMMARY

Disclosed herein methods for scheduling the automated manufacturing of mattresses to optimize a single piece flow production system using short period repeat interval analysis techniques. Aspects include receiving a plurality of customer orders for mattresses, wherein each of the plurality of customer orders includes a due date and organizing the plurality of customer orders into production batches based on the due dates. Aspects also include analyzing a first production batch of the daily production schedule and responsively creating an optimized hour production batch and based on a determination that the optimized first production batch exceeds a performance threshold 1, dispatching the first hourly production batch to an automated manufacturing system for production. Based on a determination that the optimized first hour production batch does not exceed the performance threshold, aspects further include analyzing a second production batch and modifying the optimized first production batch and the second production batch to create an optimized second production batch.

Also disclosed herein are methods for scheduling the automated manufacturing of a short period batch of mattresses. Aspects include receiving a production batch including a plurality of mattresses to be manufactured, creating a quilt assembly order from the production batch and dispatching the quilt assembly order to a quilt assembly to begin production at a first time. Aspects further include creating a coil assembly order from the preliminary production batch and dispatching the coil assembly order to a pocket coil assembly unit to begin production at a second time, wherein a time period between the first time and the second time is equivalent to the period of production.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Disclosed herein is a method for scheduling the automated manufacturing mattresses that overcomes many of the above noted problems in the prior art.

In exemplary embodiments, the creation of the optimized hour production batches may include the use of computer simulations, mixed integer programing or other well-known optimization techniques. In addition, it will be appreciated by those of ordinary skill in the art that although the production batches discussed herein are referred to as hourly or first, second or third hour batches, the production batches may correspond to any suitable time period and are not limited to being one hour in length.

Figure 1:
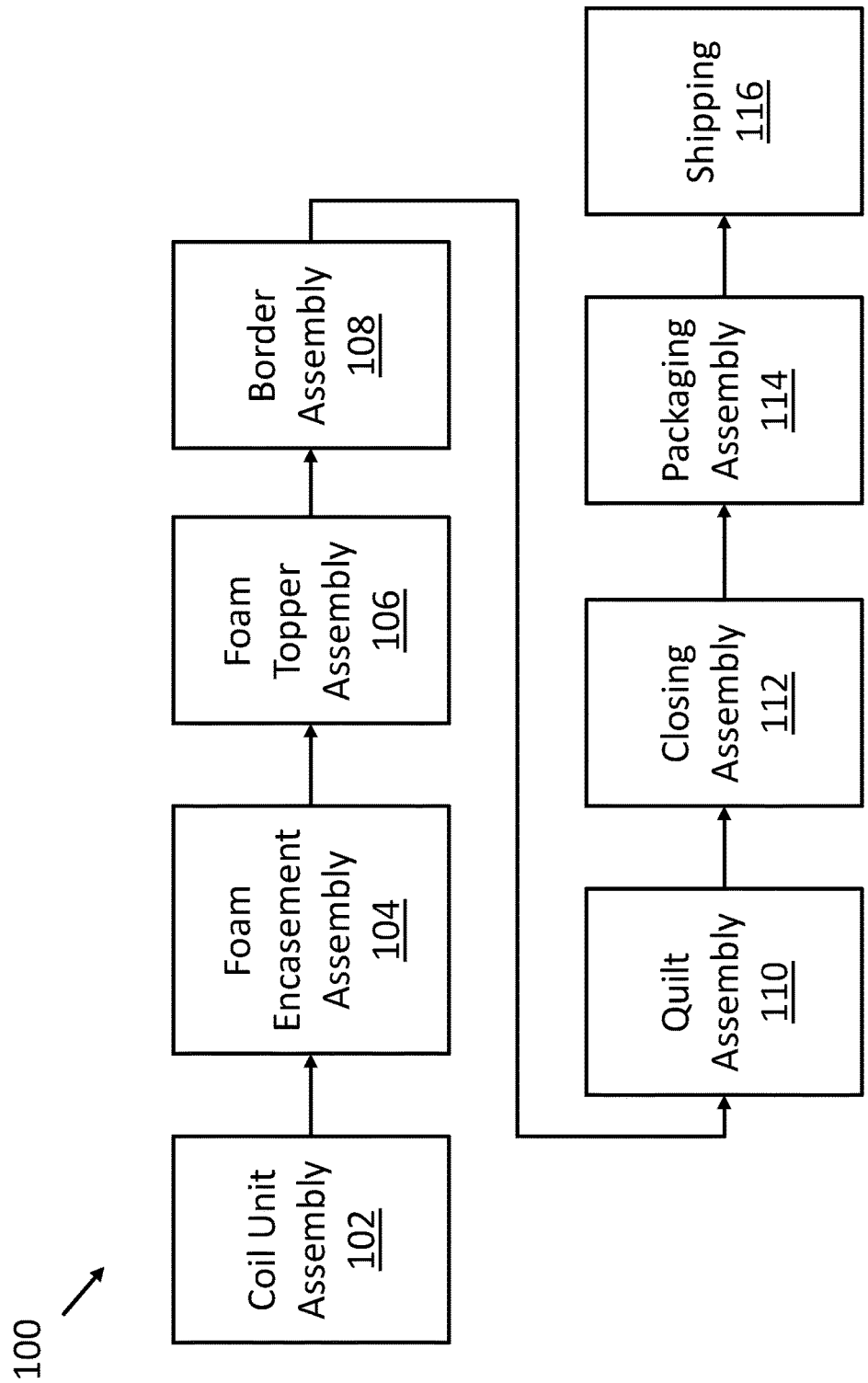
FIG. 1 depicts an exemplary process flow for the manufacture of a mattress.

Referring now to FIG. 1, an exemplary process 100 flow for the automated manufacturing of a mattress in accordance with an embodiment is shown. In exemplary embodiments, the automated manufacturing process 100 includes, but is not limited to, a coil unit assembly 102, a foam encasement assembly 104, a foam topper assembly 106, a border assembly 108, a quilt assembly 110, a closing assembly 112, a packaging assembly 114 and shipping 116. As discussed above, many of the steps of the automated manufacturing process 100 are performed by specialty machines and the time required to perform each of the steps of the process 100 may not be equal.

In exemplary embodiments, the first step in the automated manufacturing of the mattress is the coil unit assembly 102. The pocketed coil unit assembly 102 receives raw materials, including but not limited to, wire and pocket material and forms a plurality of pocket coils that are joined together to make an innercore unit. In some embodiments, the pocket coils are manufactured separately and are introduced into the production system as complete purchased items. In exemplary embodiments, the pocketed coil unit assembly 102 is configured to use multiple types of wires and various coilers to make pocketed coils that have a variety of configurations, including both coil material and coil type. In addition, the pocketed coil unit assembly 102 arranges the pocketed coils in various arrangements to form an innercore unit that has the specified configuration. In exemplary embodiments, the pocketed coil unit assembly 102 may also receive one or more preformed pocket coils that can be used to form the innercore unit, rather than forming all of the pocket coils used in the innercore unit.

In exemplary embodiments, the pocketed coil unit assembly 102 is capable of forming an innercore unit in about 2 minutes. However, the throughput of the pocketed coil unit assembly 102 will be affected by any changeover needed when switching between forming various coil types and in using various coil materials. For example, in one embodiment, the pocketed coil unit assembly 102 may include two coil machines that are configured to make different types of coils and to receive a plurality of coil materials. If a third type of coil is needed for a specific mattress configuration, one of the coil machines may need to be changed over, or modified, to form the third type of coil. Likewise, the coiling machines may experience some down time when switching form one coiling material to another. Accordingly, in exemplary embodiments the order in which the innercore units for mattresses are made by the pocketed coil unit assembly 102 will affect the throughput of pocketed coil unit assembly 102.

In exemplary embodiments, the innercore unit may be comprised of conventional helical or semi-helical coil springs and/or foam known and used in the art today. The coil springs may be open or encased in a fabric material, either individually in pockets, in groups, or in strings joined by fabric, all of which are well-known in the bedding art. For many years, one form of spring assembly construction has been known as Marshall Construction. In Marshall Construction, individual wire coils are each encapsulated in fabric pockets and attached together in strings which are arranged to form a closely packed array of coils in the general size of the mattress. Examples of such construction are disclosed in U.S. Pat. Nos. 685,160, 4,234,983, 4,234,984, 4,439,977, 4,451,946, 4,523,344, 4,578,834, 5,016,305 and 5,621,935, the disclosures of which are incorporated herein by reference in their entireties.

Alternatively, the innercore unit may be formed of foam, air bladders, or a combination of support materials such as foam, bladders, and coils springs. The foam, in some embodiments, can be a monolithic block of a single type of resilient foam selected from foams having a range of densities (themselves well-known in the art) for supporting one or more occupants during sleep. In one embodiment, foam core is made of any industry-standard natural and/or synthetic foams, such as (but not limited to) latex, polyurethane, or other foam products commonly known and used in the bedding and seating arts having a density of 1.5 to 1.9 and 20 to 35 ILD. Although a specific foam composition is described, those skilled in the art will realize that foam compositions other than one having this specific density and ILD can be used. For example, foams of various types, densities, and ILDs may be desirable in order to provide a range of comfort parameters to the buyer.

In an alternative embodiment, the innercore unit may comprise one or more horizontal layers of multiple types of foams arranged in a sandwich arrangement. This sandwich of different foams, laminated together, may be substituted for a homogeneous foam block of a single density and/or ILD. In a further embodiment, the innercore unit may comprise one or more vertical regions of different foam compositions (including vertical regions having multiple horizontal layers), where the different foams are arranged to provide different amounts of support (also referred to as "firmness" in the art) in different regions of the sleeping surface. Accordingly, the present disclosure is not limited to any particular type of foam density or ILD or even to a homogenous density/ILD throughout the innercore unit.

Once the pocketed coil unit assembly 102 has completed forming the innercore unit of the mattress, the automated manufacturing process 100 proceeds to the foam encasement assembly 104. The foam encasement assembly 104 forms a foam encasement, also referred to as a bucket, which is configured to receive the innercore unit formed by the pocketed coil unit assembly 102. In exemplary embodiments, the foam encasement assembly 104 cuts and glues foam rails to the appropriate size to form the foam encasement and places the innercore unit inside of the foam encasement. In exemplary embodiments, the type of foam used to make the foam encasement may vary from one mattress to another during production. In exemplary embodiments, the foam encasement assembly 104 is capable of receiving an innercore unit, forming a foam encasement and placing the innercore unit in the foam encasement in about 1 minute.

Once the foam encasement assembly 104 is completed, the automated manufacturing process 100 proceeds to the foam topper assembly 106. The foam topper assembly 106 receives the foam encasement with the innercore unit disposed inside and adds one or more layers of foam to the top of the mattress. In exemplary embodiments, the foam topper assembly 106 is configured to add multiple layers of foam material to the top of the mattress. The layers of foam are selected from a wide variety of foam materials that are available to the foam topper assembly 106. In exemplary embodiments, the foam topper assembly 106 automatically picks and places each of the desired topper foams and performs an automated gluing process to ensure foam composite bonding. In exemplary embodiments, the configuration and type of foam topping materials used to form the foam topper of a mattress may vary from one mattress to another during production. In exemplary embodiments, the foam encasement assembly 104 is capable of receiving a foam encasement with the innercore unit, picking, placing and gluing the foam topper onto the foam encasement with the innercore in about 1 minute.

Once the foam topper assembly 106 is completed, the automated manufacturing process 100 proceeds to the border assembly 108. The border assembly 108 receives the mattress with the foam topper and forms a border around the foam encasement. In exemplary embodiments, the boarder includes one or more layers of fabric with decorative stitching and a handle assembly. The boarder may also include the half cap bottom panel and a half cap topper for mattress with a pillow top. In exemplary embodiments, the types and configuration of the materials used in forming the boarder can vary from one mattress to the next. In exemplary embodiments, the foam topper assembly 106 is capable of receiving a mattress and forming and affixing the boarder to the mattress in about 1 minute.

Once the border assembly 108 is completed, the automated manufacturing process 100 proceeds to the quilt assembly 110. The quilt assembly 110 is configured to receive a plurality of fabrics and foam materials and to create a quilted topper that is placed on the top of the mattress. In exemplary embodiments, the quilted topper includes a plurality of fabrics and foam materials are that are arranged in layers and are quilted together. The configuration and types of fabrics and foam materials that are used to form each quilted topper can vary from one mattress to the next in the manufacturing process.

In exemplary embodiments, the quilt assembly 110 is capable of forming a quilted topper in about 1 minute. However, the throughput of the quilt assembly 110 will be affected by any changeover needed when switching between forming various quilted topper configurations which require different raw materials. For example, in one embodiment, the quilt assembly 110 may include a quilting machine that is configured to receive four layers of raw materials including fabrics and foam layers. If the combination of these materials changes from one mattress to the next, the operation of the quilting machine will be interrupted as the inputs to the machine are switched over to the materials needed for the next mattress. Accordingly, in exemplary embodiments the order in which the quilted toppers for mattresses are made by the quilt assembly 110 will affect the throughput of the quilt assembly 110.

In addition, during the changeover process for the quilt assembly 110 an amount of the raw materials that are being taken offline is wasted. In one embodiment, the raw materials are stored on large rolls that are fed into the quilting machine and during changeover the raw materials that have been unwound from the rolls of material but which have not yet used by the quilting machine are discarded as waste material when cropped to align the appropriate layers. Accordingly, in exemplary embodiments the order in which the quilted toppers for mattresses are made by the quilt assembly 110 will affect the amount of raw materials wasted by the quilt assembly 110.

Once the quilt assembly 110 is completed, the automated manufacturing process 100 proceeds to the closing assembly 112 where the quilted topper is attached to the mattress. In exemplary embodiments, the closing assembly 112 is capable of attaching a quilted topper a mattress in about 12 minutes. Next, the fully assembled mattress proceeds to the packaging assembly 114 where any labels are affixed to the mattress and where the mattress is placed into plastic wrapping. In exemplary embodiments, the packaging assembly 114 is capable packaging an assembled mattress in about 1 minute. After the mattresses have been packaged, the mattress proceeds to shipping 116 where the mattress is places onto the appropriate delivery truck. In exemplary embodiments, the shipping area may include multiple bays that each includes a truck destined for different locations. The optimization of the production orders is factored for the timing of each customer delivery.

As mentioned above, due to the large number of available mattress configurations, in order to avoid maintaining a high inventory of unsold constructed mattresses, mattresses are made on an on-demand basis, i.e., a mattress is not manufactured until it has been ordered by a customer. In exemplary embodiments, a control system for operating an automated manufacturing process receives a daily production schedule which includes hourly batches of mattresses to be produced for a given day. In exemplary embodiments, the control system is a computer having a processor and a memory. In exemplary embodiments, the mattresses are grouped into hourly production batches based on the shipping information for the mattresses. In general, mattresses that will be shipped to the same location or to locations within a given geographic area are grouped in the same or adjacent hourly production batches to avoid a buildup of inventory in the shipping area. In exemplary embodiments, the control system may create the optimized hourly batches from the daily production list every hour modeling existing, new, or modified requirements.

As discussed in more detail above with reference to FIG. 1, the various steps of the automated manufacturing process 100 each take a varying amount of time to complete. In exemplary embodiments, the quilting assembly 110 takes the longest amount of time to complete and is also subject to the highest amount of down time for changeover. Accordingly, the control system is configured to analyze an hourly production batch and determine if the optimized hourly production batch can be optimized such that it will exceed a performance threshold. In exemplary embodiments, the performance threshold can include a minimum throughput and/or a maximum scrap level. Accordingly, if the hourly production batch can be optimized to exceed a minimum throughput and to not exceed a maximum scrap level, it is released for production. Otherwise, a subsequent hourly production batch is analyzed and the current hourly production batch is modified by exchanging orders between batches until an optimization of the initial batches exceeds a minimum throughput and will not exceed a maximum scrap level. The optimization will continue into a third period if necessary and cease if limits are not achieved to release the production orders.

Figure 2A:
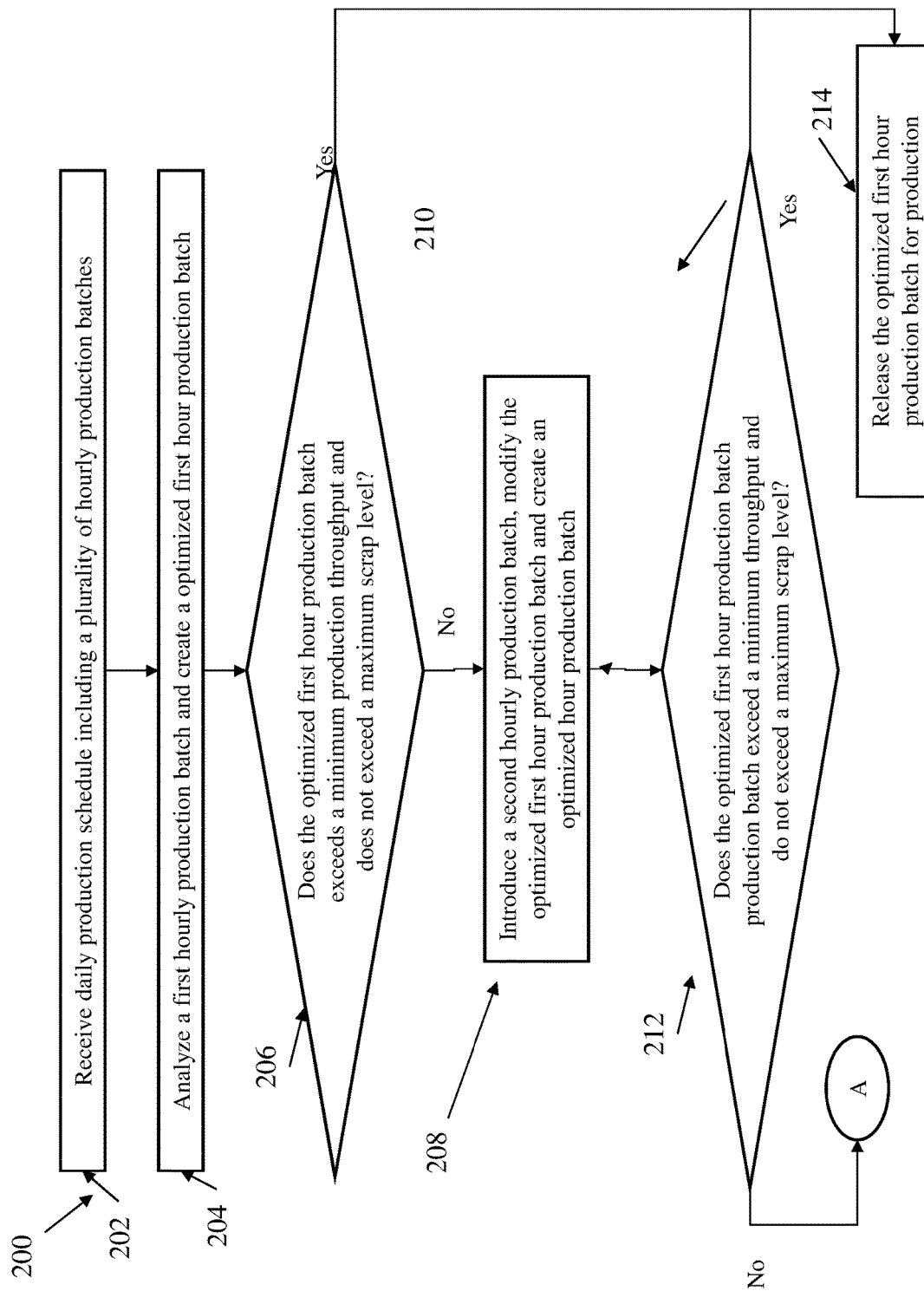
FIG. 2A illustrates a flow diagram of a method for scheduling the automated manufacturing of mattresses in accordance with an exemplary embodiment.

Referring now to FIG. 2A, a flow chart illustrating a method 200 for scheduling the automated manufacturing of mattresses in accordance with an exemplary embodiment is shown. As shown at block 202, the method 200 includes receiving a daily production schedule including a plurality of hourly production batches. Next, as shown at block 204, the method 200 includes analyzing a first hourly production batch and creating an optimized first hour production batch. In exemplary embodiments, creating the optimized first hour production batch includes ordering the mattresses to be built during the hour to minimize the number of changeovers required by the quilting assembly during the hour of production.

Continuing with reference to FIG. 2A, as shown at decision block 206, the method 200 also includes determining if the optimized first hour production batch exceeds a performance threshold. In exemplary embodiments, the performance threshold can include a minimum production throughput and does not exceed a maximum scrap level. In one embodiment, the determination that the optimized first hour production batch exceeds a minimum production throughput is based on an analysis of whether the predicted utilization rate of the quilt assembly exceeds a minimum value. In another embodiment, the determination that the optimized first hour production batch exceeds a minimum production throughput is based on an analysis of whether the predicted time for the quilt assembly to produce all of the quilted toppers in the first hour production batch is less than a maximum value. If the optimized first hour production batch exceeds the minimum production throughput and does not exceed the maximum scrap level, the method 200 proceeds to block 210 and releases the optimized first hour production batch for production. In exemplary embodiments, the minimum production throughput may be 60 units and the maximum scrap level may be 10%.

Otherwise, the method 200 proceeds to block 208 and includes analyzing a second hourly production batch, modifying the optimized first hour production batch and creating an optimized hour production batch. In exemplary embodiments, modifying the optimized first hour production batch includes exchanging production orders between the first hourly batch and the second hourly batch to maximize the throughput and minimize the scrap level of the optimized first hour production batch. Next, the method 200 proceeds to decision block 212 and determines if the optimized first hour production batch exceed a minimum throughput and do not exceed a maximum scrap level. If the optimized first hour production batch exceed a minimum throughput and do not exceed a maximum scrap level, the method 200 proceeds to block 214 and releases the optimized first hour production batch for production. Otherwise the method proceeds to block 216. In exemplary embodiments, the second minimum throughput may be lower than the first minimum throughput. That is, the required minimum throughput to release the first and second hour batches for production is less that the required minimum throughput to release the first hourly batch for production. Likewise, the second maximum scrap level may be higher than the first maximum scrap level.

Figure 2B:
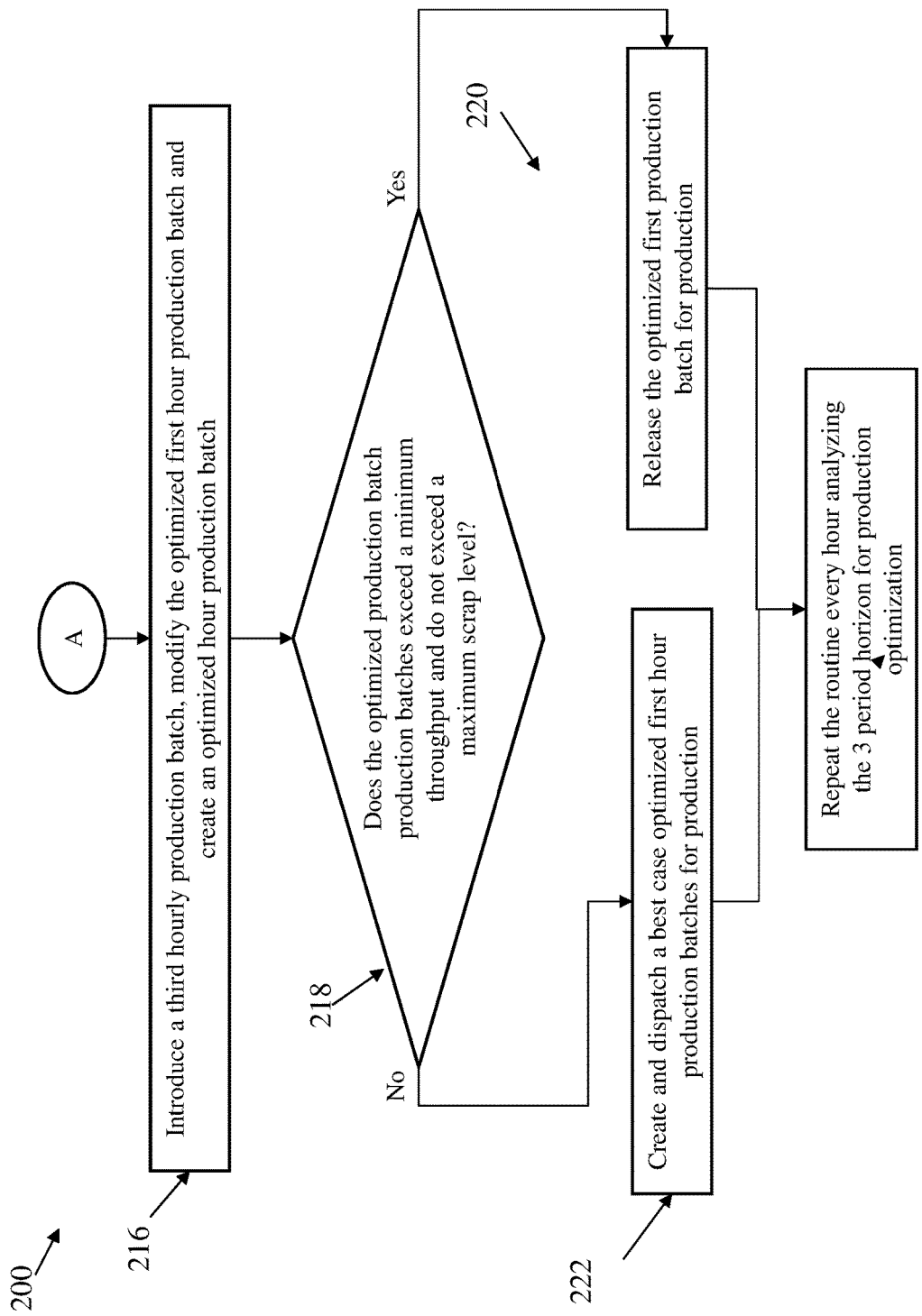
FIG. 2B also illustrates a flow diagram of a method for scheduling the automated manufacturing of mattresses in accordance with an exemplary embodiment.

Continuing with reference to FIG. 2B, as shown at block 216, the method 200 also includes analyzing a third hourly production batch, modifying again the optimized first hour production batch and creating an optimized hour production batch. In exemplary embodiments, modifying the optimized first hour production batch includes exchanging production orders between the first, second and third hourly batches to maximize the throughput and minimize the scrap level of the optimized first hour production batches.

Next, as shown at decision block 218, the method 200 includes determining if the optimized hour production batches exceed a third minimum throughput and do not exceed a third maximum scrap level. If the optimized hour production batch exceed a third minimum throughput and do not exceed a third maximum scrap level, the method 200 proceeds to block 220 and includes releasing the optimized hour production batch for production. Otherwise, the method 200 proceeds to block 222 and includes create and dispatch a best case optimized first hour production batches for production. In exemplary embodiments, the third minimum throughput may be lower than the second minimum throughput. That is, the required minimum throughput to release the first, second and third hour batches for production is less that the required minimum throughput to release the optimized first and second hour batches for production. Likewise, the third maximum scrap level may be higher than the second maximum scrap level.

In exemplary embodiments, the process of optimizing hourly production batches is performed continuously across all of the hourly production batches in a daily production schedule, which may contain any number of hourly production batches ranging from two to twenty four. In exemplary embodiments, an order for a mattress may not be moved more than a maximum delay period from its original time slot in the daily production schedule. For example, an order for a mattress that is included in the first hourly production batch may not be delayed more than three hours from its original production window. By enforcing a maximum delay period, the optimization process is prevented from serially delaying the production of mattress that cannot be efficiently produced by grouping with other mattresses, i.e., a specialty mattress that uses an uncommon configuration of materials. In exemplary embodiments, the maximum delay period may be three hours, or two hourly production batches later than an originally assigned hourly production batch.

Although discussed above primarily in terms of hourly batches, it will be appreciated by those of ordinary skill in the art that the duration of the batches may be more or less than one hour. In exemplary embodiments, the assignment of orders to batches may be performed on a continuous basis as new orders arrive and as batches are dispatched for production. In addition, orders that have been dispatched and produced but which do not pass a quality control inspection can be re-introduced into the production queue.

In exemplary embodiments, each order is provided with a due date and the orders are generally ordered in the production queue, for grouping into production batches, by their due date. Accordingly, the time at which an order is received may have little to do with its position in the production queue. Orders that haven't been dispatched from the production queue into a production batch may be canceled or modified. In exemplary embodiments, mattresses that have failed quality control inspections that are re-added to the production queue will continue to have their originally assigned due dates.

Figure 3:
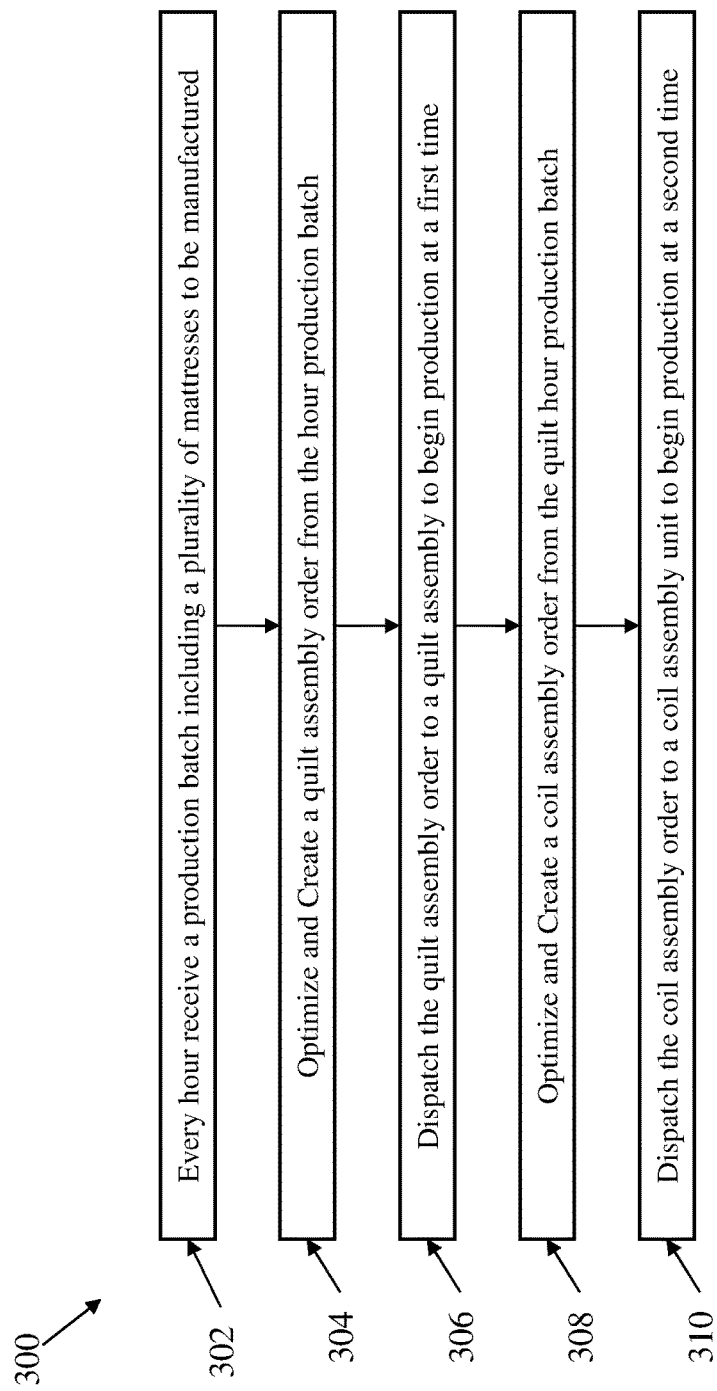
FIG. 3 illustrates a flow diagram of a method 300 for scheduling the automated manufacturing of a short period batch of mattresses in accordance with an exemplary embodiment.

Referring now to FIG. 3, a flow diagram illustrating a method 300 for scheduling the automated manufacturing of an hourly batch of mattresses in accordance with an exemplary embodiment is shown. As shown at block 302, the method 300 includes receiving an optimized hour production batch including a plurality of mattresses to be manufactured. Next, as shown at block 304, the method 300 includes optimizing and creating a quilt assembly order from the hour production batch. In exemplary embodiments, the quilt assembly order is created by ordering the plurality of mattresses to be manufactured to minimize the downtime of the quilt assembly and to minimize the waste of raw materials by the quilt assembly. After the quilt assembly order is created, it is dispatched to the quilt assembly to begin production at a first time, as shown at block 306.

Continuing with reference to FIG. 3, the method 300 also includes optimizing and creating a coil assembly order from the optimized quilt hour production batch, as shown at block 308. In exemplary embodiments, the coil assembly order is created by ordering the plurality of mattresses to be manufactured to minimize the downtime of the pocket coil assembly unit and to minimize the waste of raw materials by the pocket coil assembly unit. After the coil assembly order is created, it is dispatched to the pocket coil assembly unit to begin production at a second time, as shown at block 310. In exemplary embodiments, the coil assembly order and the quilt assembly order may not the same because they are independently created to optimize the throughput of the pocket coil unit assembly and the quilt assembly, respectively.

In exemplary embodiments, the second time at which the coil assembly order is dispatched is delayed from the first time at which the quilt assembly order is dispatched by a quilt production advance period. The quilt production advance period is based on the amount of time it takes the quilt assembly to produce all of the quilted toppers of the plurality of mattresses in the optimized hour production batch. In addition, the quilt production advance period may also be based on the amount of time it takes an order dispatched to the pocketed coil assembly unit to reach the quilt assembly. Since the coil assembly order can be different than the quilt assembly order, all of the quilted toppers must be produced by the time the first order dispatched to the pocketed coil assembly unit reaches the quilt assembly. In exemplary embodiments, the quilt production advance period may be one hour.

The mattress itself is not intended to be limited and may be of any type, dimension, and/or shape. For example, the mattress may be a foam mattress, a coiled mattress, foam and coil mattress, an air mattress, combinations thereof, or the like. Typically, the mattress is square or rectangular-shaped and has a thickness ranging from about 4 inches to about 20 inches. The length and width can vary depending on the intended application and typically has a width of about 2 feet to about 7 feet and a length of about 4 feet to about 10 feet, although custom sizes may require smaller or larger dimensions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for scheduling automated manufacturing of mattresses, the method comprising:
   receiving, by a processing device, a plurality of customer orders for mattresses, wherein each of the plurality of customer orders includes a due date;
   organizing the plurality of customer orders into production batches based on the due dates;
      analyzing a first production batch of the daily production schedule and responsively creating an optimized hour production batch;
   based on a determination that the optimized first production batch exceeds a performance threshold, operating an automated manufacturing system to produce the first hourly production batch;
   based on a determination that the optimized first hour production batch does not exceed the performance threshold:
      analyzing a second production batch; and
      modifying the optimized first production batch and the second production batch to create an optimized second production batch.

2. The method of claim 1 further comprising:
   based on a determination the optimized first production batch as modified exceeds a second performance threshold, operating the automated manufacturing system to produce the optimized first production batch.

3. The method of claim 2, further comprising:
   based on a determination the optimized first production batch does not exceed the second performance threshold:
      analyzing a third production batch;
      modifying the optimized first production batch and the third production batch to create an optimized third production batch.

4. The method of claim 3, further comprising:
   based on a determination the first optimized production batch exceeds a third performance threshold, dispatching the optimized first production batch to the automated manufacturing system for production.

5. The method of claim 1, wherein modifying the optimized first production batch comprises exchanging at least one production order between the optimized first production batch and the second production batch.

6. The method of claim 3, wherein modifying the optimized first production batch with the second production batch and the third production batch comprises exchanging at least one production order between the optimized first production batch, the optimized second production batch and the third production batch.

7. The method of claim 4, wherein the second performance threshold is less than the performance threshold.

8. The method of claim 7, wherein the third performance threshold is less than the second performance threshold.

9. The method of claim 1, where the determination that the optimized first production batch exceeds the performance threshold is based on an analysis of an expected downtime of a quilt assembly of the automated manufacturing system.

10. The method of claim 1, where the determination that the optimized first production batch exceeds the performance threshold is based on an expected utilization rate of a quilt assembly of the automated manufacturing system.

* * * * *